US008262952B2

(12) United States Patent
Lawton et al.

(10) Patent No.: US 8,262,952 B2
(45) Date of Patent: Sep. 11, 2012

(54) MOLDS FOR PRODUCTION OF OPHTHALMIC DEVICES

(75) Inventors: Bruce E. Lawton, Rochester, NY (US); Stephen P. Johnston, Ashville, NY (US); Edward A. Vaquero, Fairport, NY (US); Sanjay Rastogi, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 1067 days.

(21) Appl. No.: 11/931,205

(22) Filed: Oct. 31, 2007

(65) Prior Publication Data

US 2009/0108478 A1    Apr. 30, 2009

(51) Int. Cl.
B29D 11/00    (2006.01)
(52) U.S. Cl. ........................................... 264/2.5
(58) Field of Classification Search .................. 264/2.5, 264/2.2, 328.8; 428/500; 524/285, 315; 425/575, 588
See application file for complete search history.

(56) References Cited

U.S. PATENT DOCUMENTS

| | | | |
|---|---|---|---|
| 3,916,033 A | 10/1975 | Merrill | |
| 4,113,224 A | 9/1978 | Clark et al. | |
| 4,121,896 A | 10/1978 | Shepherd | |
| 4,159,292 A | 6/1979 | Neefe | |
| 4,208,364 A | 6/1980 | Shepherd | |
| 4,208,365 A | 6/1980 | LeFevre | |
| 5,456,864 A | 10/1995 | Wicks et al. | |
| 5,639,510 A | 6/1997 | Kindt-Larsen et al. | |
| 5,690,865 A | 11/1997 | Kindt-Larsen et al. | |
| 5,753,150 A | 5/1998 | Martin et al. | |
| 5,779,943 A | 7/1998 | Enns et al. | |
| 5,843,346 A | 12/1998 | Morrill | |
| 5,859,145 A | 1/1999 | Ching et al. | |
| 6,254,803 B1 | 7/2001 | Matthews et al. | |
| 6,255,248 B1 | 7/2001 | Bansleben et al. | |
| 6,475,410 B1 * | 11/2002 | Nakagawa ..................... 264/2.5 |
| 6,511,617 B1 * | 1/2003 | Martin et al. ................. 264/1.36 |
| 6,517,776 B1 | 2/2003 | Rodgers et al. | |
| 6,525,123 B1 | 2/2003 | Yang et al. | |
| 6,582,631 B1 | 6/2003 | Shepard | |
| 6,610,215 B1 | 8/2003 | Cai et al. | |
| 6,664,320 B1 | 12/2003 | Cai et al. | |
| 6,682,791 B2 | 1/2004 | McKnight | |
| 6,689,314 B2 | 2/2004 | Bushman et al. | |
| 6,818,150 B2 | 11/2004 | Galland et al. | |
| 6,818,151 B2 | 11/2004 | Yang et al. | |
| 6,872,451 B2 | 3/2005 | Ebner et al. | |
| 6,878,774 B2 * | 4/2005 | Kikuchi et al. ................. 525/66 |
| 6,946,175 B2 | 9/2005 | Yang et al. | |
| 7,052,628 B2 | 5/2006 | Schmidt et al. | |
| 7,056,565 B1 | 6/2006 | Cai et al. | |
| 7,078,100 B2 | 7/2006 | Ebner et al. | |

(Continued)

FOREIGN PATENT DOCUMENTS

EP    0 362 137    4/1990

(Continued)

*Primary Examiner* — Larry Thrower
(74) *Attorney, Agent, or Firm* — John E. Thomas

(57) ABSTRACT

A mold assembly for the manufacture of at least one ophthalmic device used in or on the eye is disclosed. The mold assembly includes a mateable pair of mold parts wherein at least one of the mold parts comprises at least an oxygen-absorbing mold material and an oxygen scavenger composition containing (i) an oxygen scavenging polymer comprising a polymer backbone and one or more substituted or unsubstituted cyclic olefinic groups covalently linked to the polymer backbone; and (ii) an oxygen scavenging catalytic amount of a transition metal catalyst.

16 Claims, 2 Drawing Sheets

U.S. PATENT DOCUMENTS

| | | |
|---|---|---|
| 7,097,890 B1 | 8/2006 | Ching et al. |
| 7,153,891 B2 | 12/2006 | Speer |
| 7,186,464 B2 | 3/2007 | Laplante et al. |
| 2002/0115768 A1* | 8/2002 | Kikuchi et al. ............... 524/285 |
| 2003/0235708 A1* | 12/2003 | Yang et al. .................... 428/500 |
| 2004/0170780 A1 | 9/2004 | Giraud |
| 2006/0177653 A1 | 8/2006 | Rivett et al. |

FOREIGN PATENT DOCUMENTS

| | | |
|---|---|---|
| WO | WO 96/11782 | 4/1996 |
| WO | WO 97/07161 | 2/1997 |
| WO | WO 97/44364 | 11/1997 |
| WO | WO 98/51758 | 11/1998 |
| WO | WO 98/51759 | 11/1998 |
| WO | WO 99/47344 | 9/1999 |

* cited by examiner

MOLDS FOR PRODUCTION OF OPHTHALMIC DEVICES

BACKGROUND OF THE INVENTION

1. Technical Field

The present invention generally relates to improved molds for the production of ophthalmic devices such as contact lenses, intraocular lenses, and other ophthalmic products.

2. Description of the Related Art

Cast molding of ophthalmic devices such as contact lenses is well known. Typically, the contact lens-forming monomer mixture will contain monomers capable of forming suitable polymers, crosslinkers, catalysts, polymerization initiators, and the like which are mixed neat or mixed in suitable diluents or solvents and placed into an anterior mold half. The posterior mold half is then pressed into the anterior mold half and the monomer mixture is polymerized. The lenses obtained from this process conform to the shape of the cavity formed between the two mold halves and exhibit surface characteristics which correspond to the mold surfaces. After the lenses are cast, they are ready for further processing such as cleaning, polishing and/or edging and hydration, as necessary.

The mold pieces used in casting contact lenses have been made of plastic materials which are substantially inert to the monomers employed and to the polymerization process employed. Typically, these plastic mold pieces are discarded after a single use.

Certain contact lenses manufactured by the cast molding process, particularly those known as hydrogels, can have a noticeable frequency of cosmetic defects on their surfaces. Generally, cosmetic defects are sites or areas found on the surface of the lens which can scatter light and indicate the occurrence of an irregular surface area as compared to the rest of the lens surface. While these cosmetic defects cannot usually be seen by the naked eye, they do appear when examined under a slit lamp or by magnification. Although these cosmetic defects are generally not associated with any medical or health concerns, they can lead to slight deficiencies in optimal visual performance of the lenses. In addition, these cosmetic defects can be associated with processing, shipping and handling problems as lenses which contain these defects tend to more easily stick to themselves and to the packaging materials. Finally, improving the polymerization at the lens surfaces results in improved yields of acceptable lenses obtained from the cast molding process.

It has long been known that the presence of oxygen inhibits complete free radical polymerization. Accordingly, conventional cast molding processes have been conducted in inert environments in order to eliminate the effects of oxygen on the polymerization process. These cast molding processes have been found adequate for overall polymerization resulting in a degree of polymerization of greater than about 99% of the bulk lens. Such cast molding techniques have been widely used commercially.

However, oxygen may still have an effect on the free radical polymerization of the contact lens material even when the polymerization is conducted under inert atmospheric conditions. It has been found that certain plastic mold pieces contain sufficient oxygen within the structural matrix of the plastic to adversely affect polymerization at the interface between the mold surface and the surface of the lens. It is believed that the oxygen migrates to the surface of the plastic mold piece during free radical polymerization and inhibits complete polymerization at the lens surface. In addition, the presence of oxygen in the environment is believed to cause reduced crosslinking density at the lens surface. It is this incomplete polymerization or reduced crosslinking density at the lens surface which is believed to cause the cosmetic defects described above.

In order to overcome these problems, molds for making soft contact lenses have been treated to affect their surface properties. For example, U.S. Pat. No. 4,159,292 discloses the use of silicone wax, stearic acid, and mineral oil as additives for plastic mold compositions to improve the release of the contact lens from the plastic molds. U.S. Pat. No. 5,690,865 discloses an internal mold release agent such as waxes, soaps, and oils, including a polyethylene wax having a molecular weight of 5,000 to 200,000 or a silicone polymer having a molecular weight of 2,000 to 100,000. U.S. Pat. No. 5,639,510 discloses a surface-applied surfactant in the form of a uniform layer or very thin film or coating to assist in the release from each other of mold components of a multi-part mold employed in the molding of hydrophilic contact lenses. Polymeric surfactants that can be used include polyoxyethylene sorbitan mono-oleates which are applied to a non-optical surface of the mold, but do not cover the optical surface of the mold.

European Patent Application EP 0 362 137 A1 discloses the coating of molds with a co-reactive hydrophilic polymer such as polyvinyl alcohol (PVA), ethoxylated PVA, or hydroxyethyl cellulose, in order to provide a permanent hydrophilic coating on the lens. The mold coating copolymerizes with the lens material in the mold. Similarly, U.S. Pat. No. 3,916,033 ("the '033 patent"), discloses coating the surface of a mold with polyvinylpyrrolidone to form a coating that is later to come into contact with a previously crosslinked silicone lens. The '033 patent further discloses spreading a coating solution over the mold while held in a chuck, thereby achieving a fairly uniform coating of several thousandths of an inch, after which the wet film is allowed to dry to form a hard glassy polymer layer of about 1 to 5 thousandths of an inch. Finally, monomeric N-vinyl pyrrolidone is dissolved in the coating ready for contact with the silicone lens.

Another example is U.S. Pat. No. 5,779,943 which discloses coating a mold with a hydrophobic latent-hydrophilic material, after which a lens material is molded therein. During curing, the mold coating is apparently transferred to the lens surface. The lens is then treated to convert the coating to a hydrophilic form.

Accordingly, there is a continued need to provide improved molds for manufacturing ophthalmic devices such as contact lenses and other ophthalmic articles placed in or on the eye.

SUMMARY OF THE INVENTION

In accordance with one embodiment of the present invention, a mold assembly for the manufacture of at least one ophthalmic device used in or on the eye is provided, the mold assembly comprising a mateable pair of mold parts, wherein at least one of the mold parts comprises an oxygen-absorbing mold material and an oxygen scavenger composition comprising (i) an oxygen scavenging polymer comprising a polymer backbone and one or more substituted or unsubstituted cyclic olefinic groups covalently linked to the polymer backbone; and (ii) an oxygen scavenging catalytic amount of a transition metal catalyst.

In accordance with a second embodiment of the present invention, a mold assembly for the manufacture of at least one ophthalmic device used in or on the eye is provided, the mold assembly comprising a mateable pair of mold parts, wherein at least one of the mold parts is made from an oxygen-absorbing mold material and an oxygen scavenger composition comprising (i) an oxygen scavenging polymer comprising a polymer backbone and one or more substituted or unsubstituted cyclic olefinic groups covalently linked to the polymer backbone; and (ii) an oxygen scavenging catalytic amount of a transition metal catalyst.

In accordance with a third embodiment of the present invention, a method of preparing a mold assembly for the manufacture of at least one ophthalmic device used in or on the eye is provided, the method comprising the step of injection molding the parts of a mold assembly comprising at least one anterior and one posterior mold part, wherein at least one of the anterior and one posterior mold part comprises an oxygen-absorbing mold material and an oxygen scavenger composition comprising (i) an oxygen scavenging polymer comprising a polymeric backbone and one or more substituted or unsubstituted cyclic olefinic groups covalently linked to the polymer backbone; and (ii) an oxygen scavenging catalytic amount of a transition metal catalyst.

In accordance with a fourth third embodiment of the present invention, a method of molding an ophthalmic device for use in or on the eye is provided, the method comprising the steps (a) providing a mold assembly comprising at least one anterior and one posterior mold part for production of the ophthalmic device wherein at least one of the anterior and one posterior mold part comprises an oxygen-absorbing mold material and an oxygen scavenger composition comprising (i) an oxygen scavenging polymer comprising a polymeric backbone and one or more substituted or unsubstituted cyclic olefinic groups covalently linked to the polymer backbone; and (ii) an oxygen scavenging catalytic amount of a transition metal catalyst; and (b) cast molding the at least one ophthalmic device using the mold assembly.

The mold assembly of the present invention is advantageously prepared such that the mold assembly may be stored until use employing no special storage conditions, e.g., the mold assembly can be stored in an oxygen environment with substantially no change to the oxygen content of the mold. Further, by molding an ophthalmic device such as a contact lens employing the mold assembly of the present invention, the surface characteristics of the cast molded ophthalmic device may be improved.

DETAILED DESCRIPTION OF THE PREFERRED EMBODIMENTS

The present invention is directed to mold assemblies for the manufacture of at least one ophthalmic device used in or on the eye. Although the invention is applicable to the molding of a variety of ophthalmic devices placed on or in the eye, for example, intraocular lenses, contact lenses, delivery devices for therapeutic agents, and the like, the invention is especially useful and advantageous for cast molding contact lenses such as soft (hydrogel) contact lenses. By way of example, therefore, the invention will be described herein with reference to the molding of a contact lens.

Figure 1:
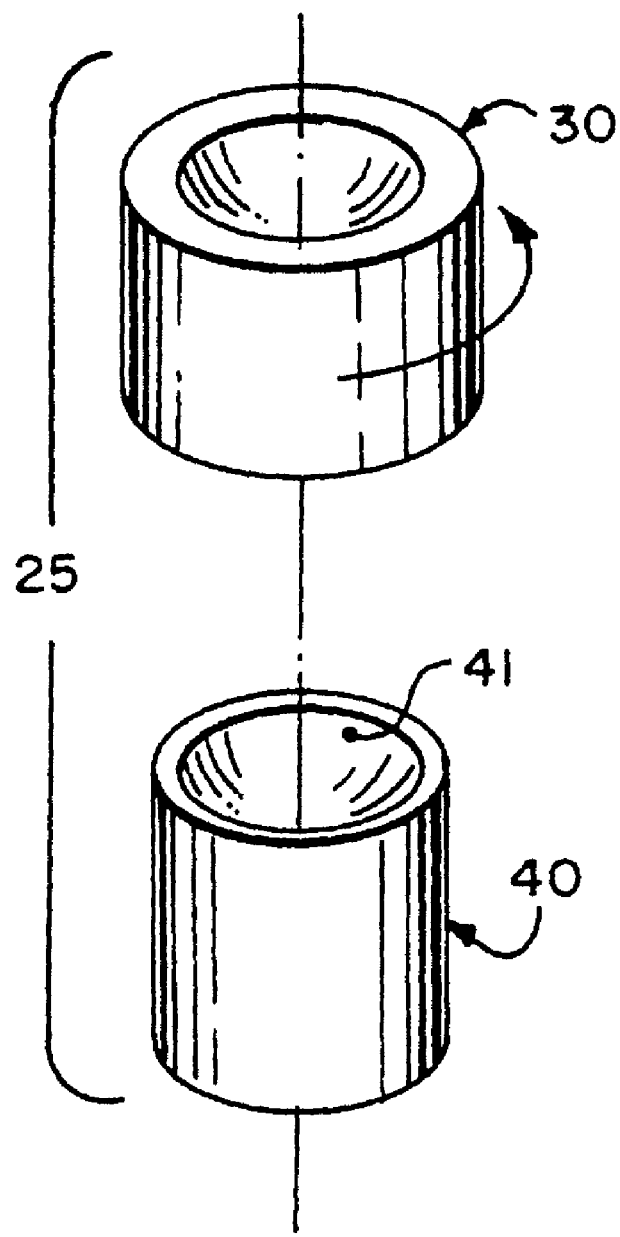
FIG. 1 is a schematic exploded view of a representative mold assembly according to an embodiment of the present invention.
Figure 2:
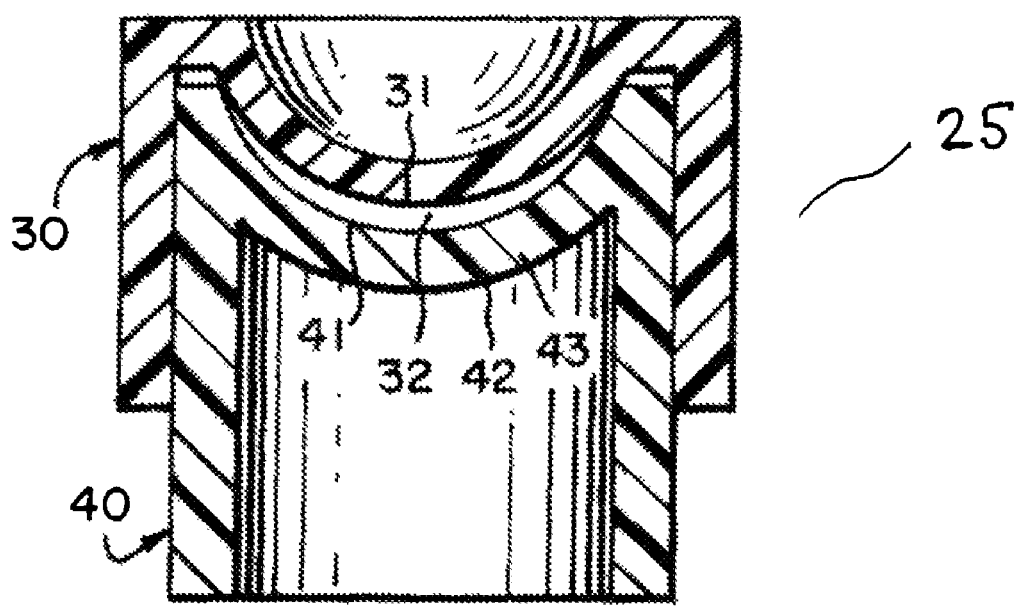
FIG. 2 is a schematic cross-sectional view of the mold assembly of FIG. 1 assembled for cast molding a contact lens.

In general, a mold assembly of the present invention will include at least a mateable pair of mold parts in which at least one of the mold parts is formed from an oxygen-absorbing mold material and an oxygen scavenger composition. A representative example of a mold assembly of this invention is generally depicted as mold assembly 25 in FIGS. 1 and 2. In general, the mold assembly includes posterior mold 30 having a posterior mold cavity defining surface 31 (which forms the posterior surface of the molded lens), and anterior mold 40 having an anterior mold cavity defining surface 41 (which forms the anterior surface of the molded lens). When the mold sections are assembled, a mold cavity 32 is formed between the two defining surfaces that correspond to the desired shape of the contact lens molded therein. As seen in FIGS. 1 and 2, anterior mold section 40 includes surface 42 opposed to anterior mold cavity defining surface 41, surfaces 41 and 42 defining segment 43 therebetween of mold section 40. Opposed surface 42 of mold 40 does not contact the polymerizable lens mixture in casting contact lenses, i.e., opposed surface 42 does not form part of mold cavity 32.

At least one of the mold sections, i.e., the anterior mold or posterior mold, of the mold assembly according to the present invention is injection molded from an oxygen-absorbing mold material and an oxygen scavenger composition as described hereinbelow in any suitable injection molding apparatus. The oxygen-absorbing mold material is generally made of a plastic material which provides the specific physical characteristics to the lens. Suitable plastic material includes thermoplastic resins which generally have high oxygen permeabilities. As mentioned above, it is believed that dissolved or free oxygen migrates through the plastic material and to the interface between the surface of the mold piece and the surface of the lens. It is the dissolved or free oxygen which can be substantially removed by the oxygen scavenger composition of the mold assembly of the present invention. Preferred oxygen-absorbing mold material can be those polymers and copolymers which contain predominantly polyolefins. Useful polyolefins include polyethylene, polypropylene, polystyrene and the like and mixtures thereof. Polypropylene is the most preferred plastic mold material.

Generally, the oxygen scavenger composition for use in forming at least one mold section of a mold assembly according to the present invention will contain at least (i) an oxygen scavenging polymer comprising a polymer backbone and one or more substituted or unsubstituted cyclic olefinic groups covalently linked to the polymer backbone; and (ii) an oxygen scavenging catalytic amount of a transition metal catalyst. Oxygen scavenger compositions useful in the context of this invention, as well as methods for their preparation, have been described in, for example, U.S. Pat. No. 7,097,890 and U.S. Patent Application Publication No. 20060177653.

The oxygen scavenging polymer of the oxygen scavenger composition can be a homopolymer, copolymer, terpolymer and higher order polymers. The polymeric backbone of the oxygen scavenging polymer can be a polyester, polyether, polythioether, polycarbonate, polyamide, ethylene or polyethylene, or a combination of two or more thereof. In one embodiment, the polymeric backbone can comprise monomers of ethylene or styrene. Preferably, the polymeric backbone is ethylenic. It is also preferred that the one or more substituted or unsubstituted cyclic olefinic groups be pendant to the polymeric backbone. A suitable cyclic olefinic group is a substituted or unsubstituted cycloalkenyl group having the structure of Formula I:

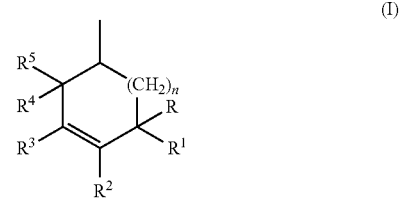

(I)

wherein R, $R^1$, $R^2$, $R^3$, $R^4$ and $R^5$ are independently hydrogen or a substituted or unsubstituted $C_1$-$C_4$ alkyl group such as methyl or ethyl, n is an integer from 0 to 4, inclusive; and, when $R^2$ and $R^3$ are hydrogen, at least one of R, $R^1$, $R^4$ and $R^5$ is also hydrogen. In one embodiment, R, $R^1$, $R^2$, $R^3$, $R^4$ and $R^5$ are each hydrogen and n is 1.

If desired, the oxygen scavenging polymer can further comprise a linking group linking the polymeric backbone and the cyclic olefinic group. Suitable linking groups include, but are not limited to, —O—$(CHR^6)_m$—; —(C=O)—O—$(CHR^6)_m$—; —NH—$(CHR^6)_m$—; —O—(C=O)—$(CHR^6)_m$—; —(C=O)—NH—$(CHR^6)_m$—; or —(C=O)—O—CHOH—$CH_2$—O—; wherein $R^6$ is hydrogen, or a substituted or unsubstituted $C_1$-$C_4$ alkyl group such as methyl, ethyl, propyl or butyl; and m is an integer from 1 to 12, inclusive.

Representative examples of cyclic olefinic groups covalently linked to the polymeric backbone include, but are not limited to, cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-dimethyl cyclohexene-4-ethylene radical, 2,5-dimethyl cyclohexene-4-ethylene radical, 1,2,5-trimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, and 1,2,5-trimethyl cyclohexene-4-propylene radical.

The oxygen scavenging polymers can further contain alkyl acrylate pendant groups in addition to the cyclic olefinic groups. Therefore, the oxygen scavenger compositions can include copolymers of ethylene and (meth)acrylic esters of linear, branched or cyclic alkanols having, for example, 1 to about 28 carbon atoms, or terpolymers further containing the cyclic olefinic groups described herein.

In a preferred embodiment, the polymer comprises an ethylenic backbone having both alkyl (meth)acrylate and cyclic olefinic pendant groups linked to the ethylenic backbone. Such polymers are also referred to as ethylene/alkyl (meth) acrylate/cyclohexenyl alkyl (meth)acrylate terpolymers. One particularly preferred polymer comprises an ethylene/methyl acrylate/cyclohexenyl methyl acrylate terpolymer, referred to as EMCM. Other examples of oxygen scavenging polymers are cyclohexenylmethyl acrylate (CHAA) homopolymer a cyclohexenylmethyl acrylate copolymer, a cyclohexenylmethyl methacrylate homopolymer (CHMA), a cyclohexenylmethyl methacrylate copolymer and ethylene/methyl acrylate/cyclohexenylmethyl acrylate terpolymer (EMCM). These polymers can be obtained by methods well known in the art, e.g., EMCM can be readily made following the teachings of U.S. Pat. No. 7,097,890.

In combination with the oxygen scavenging polymer, the oxygen scavenger composition will also include a transition metal compound as an oxygen scavenger catalyst to accelerate the rate of oxygen scavenging. Though not wishing to be bound by any particular theory, useful catalysts include those which can readily interconvert between at least two oxidation states. The transition metal catalyst can be a salt which includes a metal selected from the first, second, or third transition series of the Periodic Table. For example, the metal can be Rh, Ru, or one of the elements in the series of Sc to Zn (i.e., Sc, Ti, V, Cr, Mn, Fe, Co, Ni, Cu, and Zn), more preferably at least one of Mn, Fe, Co, Ni, and Cu, and most preferably Co. Suitable anions for such salts include, but are not limited to, chloride, acetate, oleate, stearate, palmitate, 2-ethylhexanoate, neodecanoate, and naphthenate. Representative salts include cobalt (II) 2-ethylhexanoate, cobalt oleate, and cobalt (II) neodecanoate (The metal salt can also be an ionomer, in which case a polymeric counterion is employed).

The oxygen scavenger composition can further include one or more antioxidants to retard degradation of the components during compounding. Suitable antioxidants include 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E (.alpha.-tocopherol), octadecyl 3,5,-di-tert-butyl-4-hydroxyhydrocinnamate, tetrakis[methylene(3,5-di-tert-butyl-4-hydroxyhydrocinnamate)]methane and the like and mixtures thereof. The amount of antioxidant(s), when present, can also have an effect on oxygen scavenging. Such materials are usually present with oxidizable organic compounds or additional polymers to prevent oxidation or gelation of the polymers. The antioxidant can be present in an amount of about 0.005 to about 0.05% by weight of the total composition. However, additional amounts of antioxidant can also be added if it is desired to tailor the induction period and stability.

Other additives that also can be included in the oxygen scavenger composition include, but are not limited to, fillers, pigments, dyestuffs, processing aids, plasticizers, antifog agents, antiblocking agents, and the like.

As discussed hereinabove, the at least one mold part in the mold assembly of the present invention is formed by injection molding the oxygen-absorbing mold material and oxygen scavenger composition using any suitable injection molding apparatus. Typically, the mold assembly of the present invention is formed by injection molding a blend of the oxygen-absorbing mold material and oxygen scavenger composition, e.g., in the form of a pellet. Preferably, the injection molding is carried out under a substantially oxygen free atmosphere. Conventionally, injection molding techniques do not require removal of oxygen from the thermoplastic resin prior to molding.

In one embodiment, the at least one mold part can be obtained by employing at least one thermal initiator with the blend of the oxygen-absorbing mold material and oxygen scavenger composition in the injection molding process. Any suitable thermal initiator known in the art can be used herein. Representative free radical thermal polymerization initiators include, but are not limited to, organic peroxides, such as acetal peroxide, lauroyl peroxide, decanoyl peroxide, stearoyl peroxide, benzoyl peroxide, tertiarylbutyl peroxypivalate, peroxydicarbonate, t-butylperoctate, di-(sec-butyl) peroxydicarbonate, 2,5-dimethyl-2,5-di(2-hexanoylperoxy) hexane and the like; nitrites such as 2,2-azobisisobutyrisonitrile (AIBN), 2,2-azobisisovaleronitrile (AIVN) and the like and mixtures thereof.

When a thermal initiator is present, it can enhance and/or facilitate the initiation of oxygen scavenging by the oxygen scavenger composition in the injection molding process according to the present invention upon exposure to heat. Generally, during the injection molding process, the blend of at least the oxygen-absorbing mold material, oxygen scavenger composition and thermal initiator will be heated to a temperature sufficient to consume oxygen and form a mold section which is substantially free of oxygen. The blend will ordinarily be heated to a temperature equal to or greater than about 300° C. and preferably equal to or greater than about 400° C. Typically, the time period for heating the blend to obtain a substantially oxygen free mold section can be less than about 1 hour. The amount of thermal initiator can depend on the amount and type of cyclic unsaturation present in the polymer, the temperature used and the type of thermal initiator used. Generally, the amount of thermal initiator can range from about 0.0005 to about 5% by weight of the total blend.

In another embodiment, the at least one mold part can be obtained by employing at least one photoinitiator with the blend of the oxygen-absorbing mold material and oxygen scavenger composition in the injection molding process. Generally, the one or more photoinitiators can further facilitate and control the initiation of oxygen scavenging properties. Adding a photoinitiator or a blend of photoinitiators to the oxygen scavenger composition is particularly advantageous when antioxidants have been added to prevent premature oxidation of the composition during processing and storage.

Suitable photoinitiators for use herein can be any known photoinitiator to those skilled in the art. See, e.g., PCT publications WO 97/07161, WO 97/44364, WO 98/51758, and WO 98/51759. Representative examples of suitable photoinitiators include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis(dimethylamino)-benzophenone, acetophenone and its derivatives, such as, o-methoxy-acetophenone, 4'-methoxyacetophenone, valerophenone, hexanophenone, α-phenylbutyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetylphenanthrene, 10-thioxanthenone, 3-acetyl-phenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, benz[a]anthracene-7,12-dione, 2,2-dimethoxy-2-phenylacetophenone, α, α-diethoxyacetophenone, α, α-dibutoxyacetophenone, 4-benzoyl-4'-methyl(diphenyl sulfide), Darocure 1173, 1164, 2273, 1116, 2959, 3331 (EM Industries), Igracure 651 and 184 (Ciba-Geigy), and the like and mixtures thereof.

In this embodiment, the mold part is formed by first injection molding the blend of at least the oxygen-absorbing mold material, oxygen scavenger composition and photoinitiator, e.g., in the form of pellets, and then exposing the injection molded mold section to radiation, e.g., ultraviolet light (UV), visible light, or high energy radiation, to produce a mold section according to the present invention. As one skilled in the art will readily appreciate, it may be necessary to store the resulting mold part in a dark environment so as to prevent further exposure to light. When a photoinitiator is present, it can enhance and/or facilitate the initiation of oxygen scavenging by the composition of the present invention upon exposure to radiation. The amount of photoinitiator will ordinarily depend on, for example, the amount and type of cyclic unsaturation present in the polymer, the wavelength and intensity of radiation used, the nature and amount of antioxidants used, and the type of photoinitiator used. Generally, the amount of photoinitiator can range from about 0.0005 to about 5% by weight of the total blend.

The amounts of the components used in the oxygen scavenger composition of the present invention may affect the use and effectiveness of this composition. Thus, the amounts of polymer, transition metal catalyst, and thermal initiator or photoinitiator, can vary depending on the desired mold. For example, one of the primary functions of the polymer described above is to react irreversibly with oxygen during the scavenging process, while a primary function of the transition metal catalyst is to facilitate this process. Thus, to a large extent, the amount of polymer present affects the oxygen scavenging capacity of the composition, i.e., the amount of oxygen that the composition can consume, while the amount of transition metal catalyst affects the rate at which oxygen is consumed as well as the induction period.

The oxygen scavenger composition can provide oxygen scavenging properties at a desirable rate and capacity while having good processing and compatibility properties relative to compositions including conventional non-cyclic ethylenically unsaturated polymers. Generally, the amount of the polymeric scavenging component contained in the blend (i.e., the oxygen absorbing mold material and oxygen scavenging component used to form the blend) can range from about 0.5 to about 25% by weight, preferably from about 1 to about 20% by weight based on the total weight of the blend. The amount of transition metal catalyst will ordinarily range from about 0.0001 to about 0.1% by weight and preferably from about 0.001 to about 0.05% by weight based on the metal content only (i.e., excluding ligands, counterions, etc.).

The other mold part, i.e., posterior mold or anterior mold, can be injection molded from the same or different oxygen-absorbing mold material and/or oxygen scavenger composition. In one embodiment, both mold parts of the mold assembly of the present invention can be formed from the same oxygen-absorbing mold material and oxygen scavenger composition using the same or different processes as described above, i.e., by thermal or radiation. In another embodiment, the mold parts can be formed from the same or different oxygen-absorbing mold material using varying amounts of the same oxygen scavenger composition. Alternatively, the other mold part can be injection molded from a different resin such as a clear resin in an injection molding apparatus. Clear resins are generally more amorphous and, therefore, more dimensionally stable than polypropylene, but are also capable of transmitting a greater percentage of actinic light. Various clear resins can be used for contact lens molding purposes, including, by way of example, polyvinyl chloride (PVC), polyester, polysulfone, polyacrylate/polymethacrylate, and polycarbonate. If desired, the clear resin molds can be coated using coating compositions known in the art.

The mold assemblies of the present invention are particularly useful for improving the surface quality of contact lenses manufactured by cast molding processes using, for example, free radical polymerization techniques. Generally, the composition of the contact lenses, the molding process, and polymerization processes are well known and this invention is concerned primarily with forming the mold assembly to achieve contact lenses with improved surface characteristics and decreased frequency of cosmetic defects. Of course, the invention can also be used to improve surface quality with any free radical polymerization process using plastic mold pieces to provide a predetermined shape to the final polymerized product.

The mold assemblies of the present invention can be used with all contact lenses such as, for example, conventional hard, soft and rigid gas permeable lenses, and the composition of the monomer mix and the specific monomers used to form the lenses are not critical. The present invention is preferably employed with soft contact lenses such as those commonly referred to as hydrogel lenses, e.g., silicone hydrogel lenses, prepared from silicone and/or non-silicone monomers including, but not limited to, hydroxyethyl methacrylate, N-vinyl-pyrrolidone, glycerol methacrylate, methacrylic acid and acid esters. However, any combination of lens forming monomers in a monomeric mixture capable of forming a polymer useful in making contact lenses may be used. Hydrophobic lens forming monomers may also be included such as those containing silicone moieties. The degree of polymerization and/or the crosslinking density at the surface of the lens is believed to be improved in all contact lenses, even those which do not typically exhibit cosmetic defects. Thus, the term "contact lenses" as used herein includes hard, soft, and rigid gas permeable contact lenses as well as inocular lenses.

The monomer mix used in forming the contact lenses useful with the mold assemblies of the present invention can also include crosslinking agents, strengthening agents, free radical initiators and/or catalysts and the like as is well known in the art. Further, suitable solvents or diluents can be employed in the monomer mix, provided such solvents or diluents do not adversely affect or interfere with the polymerization process.

The method of polymerization or cure is not critical to the practice of this invention, except that this invention is particularly suitable to free radical polymerization systems as are well known in the contact lens art. Thus, the polymerization can occur by a variety of mechanisms depending on the specific composition employed. For example, thermal, photo, X-ray, microwave, and combinations thereof which are free radical polymerization techniques can be employed herein. Preferably, thermal and photo polymerizations are used in this invention with UV polymerization being most preferred.

In general, the molded lenses are formed by depositing a curable liquid such as a polymerizable monomer and/or macromer into a mold cavity of the mold section of the mold assembly of the present invention, curing the liquid into a solid state, opening the mold cavity and removing the lens. Other processing steps such as hydration of the lens can then be performed. Cast molding techniques are also well known. Generally, conventional cast molding techniques employ thermoplastic male and female mold halves of predetermined configuration which imparts the desired shape and surface configurations to the lenses formed therebetween. Examples of cast molding processes are disclosed in U.S. Pat. Nos. 4,113,224; 4,121,896; 4,208,364; and 4,208,365, the contents of which are incorporated herein by reference. Of course, many other cast molding teachings are available which can be used with the present invention providing the molds are made from thermoplastic materials.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A method of preparing a mold assembly for the manufacture of at least one ophthalmic device used in or on the eye, the method comprising the step of injection molding at least one part of a mold assembly comprising at least one anterior and one posterior mold part, wherein at least one of the anterior and one posterior mold part comprises an oxygen-absorbing mold material and an oxygen scavenger composition comprising (i) an oxygen scavenging polymer comprising a polymeric backbone and one or more substituted or unsubstituted cyclic olefinic groups covalently linked to the polymer backbone; and (ii) an oxygen scavenging catalytic amount of a transition metal catalyst.

2. The method of claim 1, wherein the oxygen-absorbing mold material comprises a polyolefin.

3. The method of claim 2, wherein the polyolefin is polypropylene.

4. The method of claim 1, where in the oxygen scavenger composition the polymeric backbone is ethylenic and the one or more substituted or unsubstituted cyclic olefinic groups have the structure of Formula I:

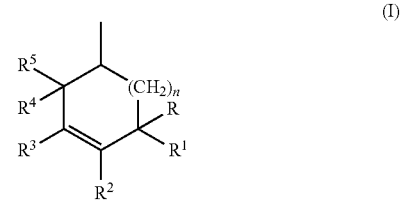

wherein R, $R^1$, $R^2$, $R^3$, $R^4$ and $R^5$ are independently hydrogen or a substituted or unsubstituted $C_1$-$C_4$ alkyl group, n is an integer from 0 to 4; and, when $R^2$ and $R^3$ are hydrogen, at least one of R, $R^1$, $R^4$ and $R^5$ is hydrogen.

5. The method of claim 1, where in the oxygen scavenger composition the one or more substituted or unsubstituted cyclic olefinic groups is selected from the group consisting of cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-dimethyl cyclohexene-4-ethylene radical, 2,5-dimethyl cyclohexene-4-ethylene radical, 1,2,5-trimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, and 1,2,5-trimethyl cyclohexene-4-propylene radical.

6. The method of claim 1, wherein the oxygen scavenging polymer of the oxygen scavenger composition is selected from the group consisting of a ethylene/methyl acrylate/cyclohexenyl methyl acrylate terpolymer, a cyclohexenyl methyl acrylate/ethylene copolymer, a cyclohexenyl methyl methacrylate/styrene copolymer, a cyclohexenyl methyl acrylate homopolymer and a methyl acrylate/cyclohexenyl methyl acrylate copolymer.

7. The method of claim 1, wherein the transition metal catalyst of the oxygen scavenger composition is a metal salt.

8. The method of claim 1, wherein each anterior and posterior mold part comprises the same or different oxygen-absorbing mold material and the same or different oxygen scavenger composition.

9. The method of claim 1, wherein the at least one anterior or posterior mold part further comprises at least one thermal initiator.

10. The method of claim 9, wherein the step of injection molding comprises heating the at least one anterior or posterior mold part comprising the oxygen-absorbing mold material, oxygen scavenger composition and thermal initiator.

11. The method of claim 1, wherein the at least one anterior or posterior mold part further comprises at least one photo-initiator.

12. The method of claim 11, further comprising exposing the at least one anterior or posterior mold part to radiation following injection molding.

13. The method of claim 1, wherein the mold assembly is used once to make an ophthalmic device and then discarded.

14. The method of claim 1, further comprising the step of cast molding at least one ophthalmic device using the mold assembly.

15. The method of claim 14, wherein the step of cast molding comprises either light or thermal curing or both.

16. The method of claim 14, wherein the ophthalmic device is a contact lens.

* * * * *